(12) United States Patent
Mavridis

(10) Patent No.: US 9,029,478 B2
(45) Date of Patent: *May 12, 2015

(54) HIGH CLARITY POLYETHYLENE FILMS

(75) Inventor: Harilaos Mavridis, Lebanon, OH (US)

(73) Assignee: Equistar Chemicals, LP, Houston, TX (US)

( * ) Notice: Subject to any disclaimer, the term of this patent is extended or adjusted under 35 U.S.C. 154(b) by 454 days.

This patent is subject to a terminal disclaimer.

(21) Appl. No.: 13/022,268

(22) Filed: Feb. 7, 2011

(65) Prior Publication Data

US 2012/0202942 A1 Aug. 9, 2012

(51) Int. Cl.
*C08L 23/04* (2006.01)
*C08L 23/08* (2006.01)
*C08J 5/18* (2006.01)

(52) U.S. Cl.
CPC ............... *C08L 23/0815* (2013.01); *C08J 5/18* (2013.01); *C08J 2323/08* (2013.01); *C08J 2423/06* (2013.01)

(58) Field of Classification Search
CPC ......... C08J 5/18; C08L 23/0815; C08L 23/06
USPC .................................................. 525/240, 191
See application file for complete search history.

(56) References Cited

U.S. PATENT DOCUMENTS

| | | | |
|---|---|---|---|
| 6,824,886 B2 * | 11/2004 | Tavernier | 428/516 |
| 6,870,010 B1 | 3/2005 | Lue | |
| 7,235,607 B2 * | 6/2007 | Ohlsson | 525/191 |
| 7,238,748 B2 * | 7/2007 | Oriani | 525/199 |
| 2008/0038533 A1 * | 2/2008 | Best et al. | 428/220 |
| 2009/0192270 A1 * | 7/2009 | Malakoff et al. | 525/240 |

FOREIGN PATENT DOCUMENTS

WO 2011/082045 A1 7/2011

OTHER PUBLICATIONS

Petrothene NA 942000 flyer, 1996.*
Starflex GM1810BA flyer, 2010.*
Cooke David L et al: "Addition of Branched Molecules and High Molecular Weight Molecules to Improve Optical Properties of LLDPE Film" Journal of Pastic Film and Sheeting, Lancaster, PA, US. vol. 5, No. 4, Jan. 1, 1989 (Jan. 1, 1989) ISSN: 8756-0879, DOI: 10-1177/875608798900500406 p. 298.
PCT International Search Report and the Written Opinion—Mailed on Jun. 12, 2012 for Corresponding PCT/US2012-024149.

* cited by examiner

*Primary Examiner* — Irina Krylova

(57) ABSTRACT

A film comprising a polymer blend of:
(a) 0.15 to 0.8 wt % of an LDPE having an MI of 0.1 to 0.6 dg/min; and
(b) 99.2 to 99.85 wt % of an LLDPE produced with a single-site catalyst comprising a metallocene and having a haze ($HZ_{lldpe}$), dart impact ($DI_{lldpe}$), MD-Tear ($MDT_{lldpe}$), and a slice long chain branching index of at least 0.90 for any portion of the composition having a molecular weight of 100,000 or above, wherein the film has a haze ($HZ_{blend}$), a dart impact ($DI_{blend}$), and an MD-Tear ($MDT_{blend}$), and $HZ_{blend} = a \cdot HZ_{lldpe}$, where $a$ is 0.20 to 0.70;

$DI_{blend} = b \cdot DI_{lldpe}$, where $b$ is 0.9 to 1.3; and $MDT_{blend} = c \cdot MDT_{lldpe}$, where $c$ is 0.8 to 1.1.

15 Claims, 1 Drawing Sheet

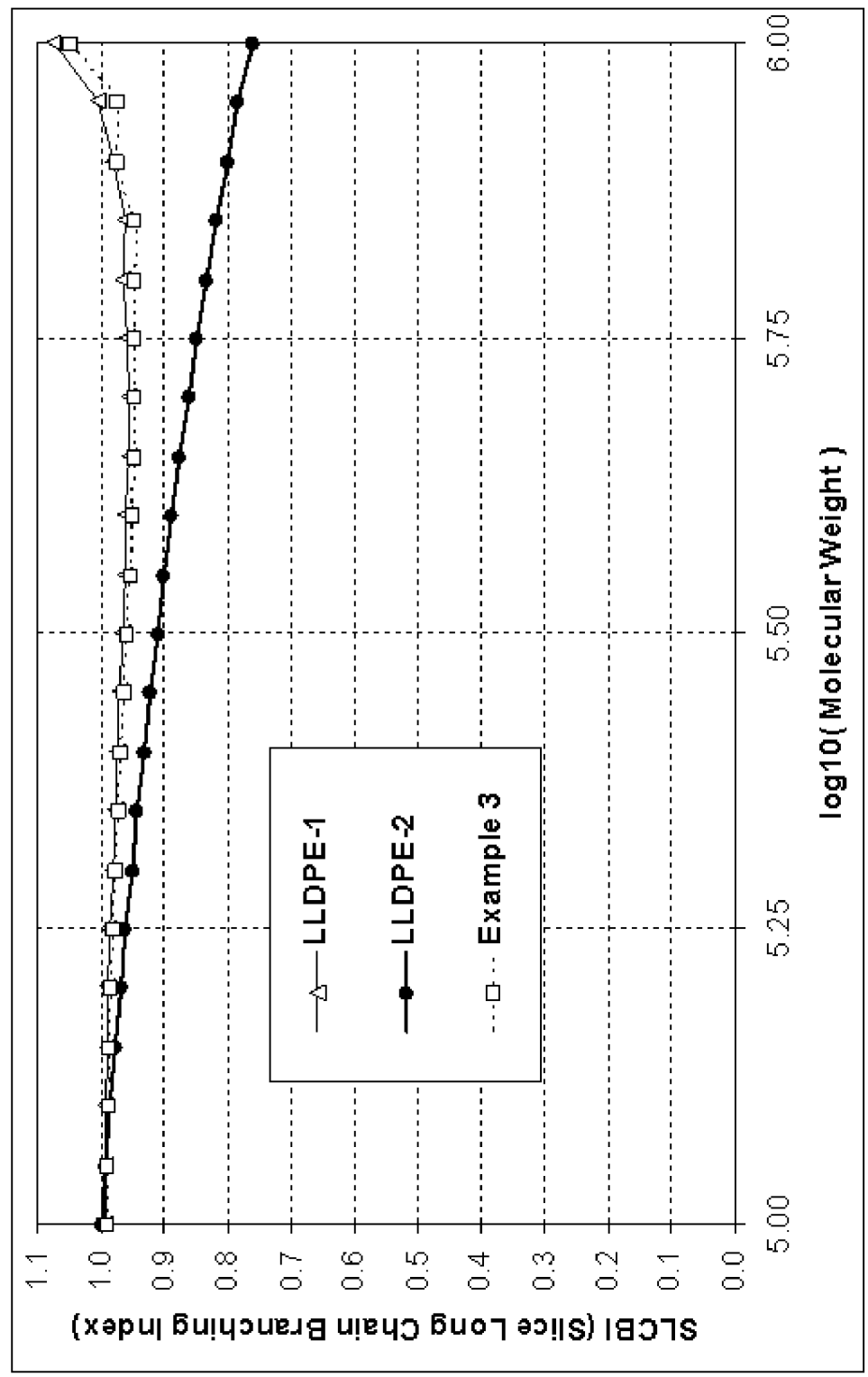

HIGH CLARITY POLYETHYLENE FILMS

FIELD OF THE INVENTION

The invention relates to films having improved haze performance made from blends of fractional melt index low density polyethylene and a linear low density polyethylene produced using a single-site catalyst.

BACKGROUND OF THE INVENTION

Polyethylene films are used in a wide range of products and applications that generally fall into the categories of packaging and non-packaging. Packaging applications include food packaging, such as in-store produce bags and other containers for food; non-food packaging applications such as those for supported structures such as gaylord boxes, or those for containing various materials such as mulch bags, and other applications using stretch and shrink wrap films. Non-packaging applications include trash bags, can liners, construction film, such as vapor barriers in walls, and consumer products such as diapers.

Physical properties important in polyethylene films include tear strength, impact strength, tensile strength, stiffness and transparency. Overall film strength is desirable so that the films may be employed in applications without risk of physical failure. Transparency is an important property since it is desirable to have the flexibility to inspect items within a container without actually opening it.

Polyethylene films have been produced using different types of polymers to meet the demands of particular applications. Low density polyethylene (LDPE) and linear low density polyethylene (LLDPE) can be heat-sealed and have good barrier characteristics. In addition, LDPE particularly excels in applications demanding high clarity, ease of processing and high gloss. LLDPE is especially useful for applications requiring tensile and impact strength properties. However, blends of the two polyethylenes typically result in films with good optical properties but poor physical properties, particularly for thin films. Ziegler-Natta-based LLDPE's can typically achieve clarity with the addition of LDPE, but at the expense of only modest strength levels, as evidenced, e.g., by dart impact measurements. Compositions containing metallocene-based LLDPE's blended with LDPE typically achieve high clarity levels, but at a severe loss of strength properties. It remains an industry unmet need for polyethylene films that combine both high clarity and high strength properties.

Various attempts have been made to combine the favorable optical properties of LDPE and good structural properties of LLDPEs. U.S. Pat. Publ. No. 2006/0047077 discloses plastic films prepared by coextruding a blend of 1.5 to 4.5 wt % of a high pressure low density polyethylene having a melt index of 0.1 to 0.8 dg/min, and 95.5 to 98.5 of a linear low density polyethylene. U.S. Pat. No. 6,130,293 discloses a composition containing 1 to 3 wt % of an ethylene homopolymer having a melt index of about 1 to about 4 dg/min and 97 to 99 wt % of a linear ethylene-alpha olefin copolymer. U.S. Pat. No. 5,455,303 discloses films made from a blend of a reactor-made material containing a linear low density polyethylene and a $C_3$-based material, with a low density polyethylene having a melt index of 0.2 to 20 dg/min. U.S. Pat. No. 6,870,010 discloses a low density, substantially linear polyethylene composition having a slice long chain branching index of 0.85 or less for any portion of the composition having a molecular weight of the 100,000 or above. U.S. Pat. No. 6,800,692 relates to polymer blends of metallocene-produced VLDPE having a density less than 0.916 g/cm$^3$ and LDPE. Copending application Ser. No. 12/655,427 relates to blends of LDPE and LLDPE having a balance of optical and physical properties. However, a continuing need exists for films having improved haze characteristics with minimal adverse impact on impact properties.

SUMMARY OF THE INVENTION

The invention relates to a film comprising a polymer blend of 0.15 to 0.8 wt % of an LDPE having an MI of 0.1 to 0.6 dg/min; and 99.2 to 99.85 wt % of an LLDPE produced with a single-site catalyst comprising a metallocene, and having a haze ($HZ_{lldpe}$), dart impact ($DI_{lldpe}$), MD-Tear ($MDT_{lldpe}$), and a slice long chain branching index of at least 0.90 for any portion of the composition having a molecular weight of 100,000 or above. The film has a haze ($HZ_{blend}$), a dart impact ($DI_{blend}$), and an MD-Tear ($MDT_{blend}$) satisfying the relationships:

the $HZ_{blend}=a*HZ_{lldpe}$, where $a$ is 0.20 to 0.70;

the $DI_{blend}=b*DI_{lldpe}$, where $b$ is 0.9 to 1.3; and the $MDT_{blend}=c*MDT_{lldpe}$, where $c$ is 0.8 to 1.1

BRIEF DESCRIPTION OF THE DRAWING

FIG. 1 illustrates Slice Long Chain Branching Index as a function of log 10 (Molecular Weight) for LLDPE-1, LLDPE-2, and Example 3.

DETAILED DESCRIPTION OF THE INVENTION

It has unexpectedly been found that films formed from a blend of a linear low density polyethylene produced with a single-site catalyst, particularly a metallocene-based catalyst, and very low levels of a fractional melt index low density polyethylene provides significantly reduced haze with minimal adverse affect on impact properties.

The LDPE is preferably produced by either a tubular or autoclave high-pressure polymerization process and has a melt index (MI) as measured by ASTM D 1238, condition 190/2.16, of 0.1 to 0.6 dg/min, preferably from 0.1 to 0.4 dg/min, and a density of 0.910 to 0.940 g/cm$^3$.

The LLDPE preferably has a density of 0.910 to 0.940 g/cm$^3$, more preferably from 0.910 to 0.930 g/cm$^3$ and an MI from 0.2 to 10 dg/min, preferably from 0.5 to 5.0 dg/min., and is a copolymer of ethylene and a $C_4$ to $C_8$ alpha olefin, where the alpha olefin is present in an amount sufficient to reduce the polyethylene density to the desired level, typically in an amount from about 2 wt % to about 12 wt %.

The LLDPE is produced in a single-stage or multi-stage process using a single-site catalyst, particularly a metallocene-based catalyst. When the catalyst is a metallocene-based catalyst, the metallocene compound is preferably chosen from the class of metallocene compounds of formula (I):

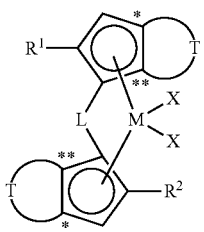

(I)

where

M is zirconium, hafnium or titanium,

X are identical or different and are each, independently of one another, hydrogen or halogen or a group —R, —OR, —OSO$_2$CF$_3$, —OCOR, —SR, —NR$_2$ or —PR$_2$, where R is linear or branched C$_1$-C$_{20}$-alkyl, C$_3$-C$_{20}$-cycloalkyl which may bear one or more C$_1$-C$_{10}$-alkyl radicals as substituents, C$_6$-C$_{20}$-aryl, C$_7$-C$_{20}$-alkylaryl or C$_7$-C$_{20}$-arylalkyl and may contain one or more heteroatoms from groups 13-17 of the Periodic Table of the Elements or one or more unsaturated bonds, with the two radicals X also being able to be joined to one another, L is a divalent bridging group selected from the group consisting of C$_1$-C$_{20}$-alkylidene, C$_3$-C$_{20}$-cycloalkylidene, C$_6$-C$_{20}$-arylidene, C$_7$-C$_{20}$-alkylarylidene and C$_7$-C$_{20}$-arylalkylidene radicals which may contain heteroatoms from groups 13-17 of the Periodic Table of the Elements or is a silylidene group having up to 5 silicon atoms, R$^1$ and R$^2$ are identical or different and are each, independently of one another, hydrogen or linear or branched C$_1$-C$_{20}$-alkyl or C$_3$-C$_{20}$-cycloalkyl which may bear one or more C$_1$-C$_{10}$-alkyl radicals as substituents, C$_6$-C$_{20}$-aryl, C$_7$-C$_{40}$-alkylaryl or C$_7$-C$_{40}$-arylalkyl and may contain one or more heteroatoms from groups 13-17 of the Periodic Table of the Elements or one or more unsaturated bonds, T and T' are divalent groups of the formulae (II), (III), (IV), (V), (VI) or (VII):

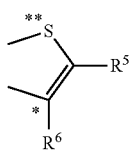

(II)

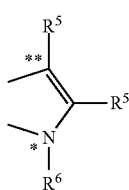

(III)

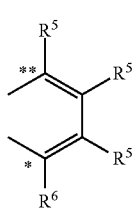

(IV)

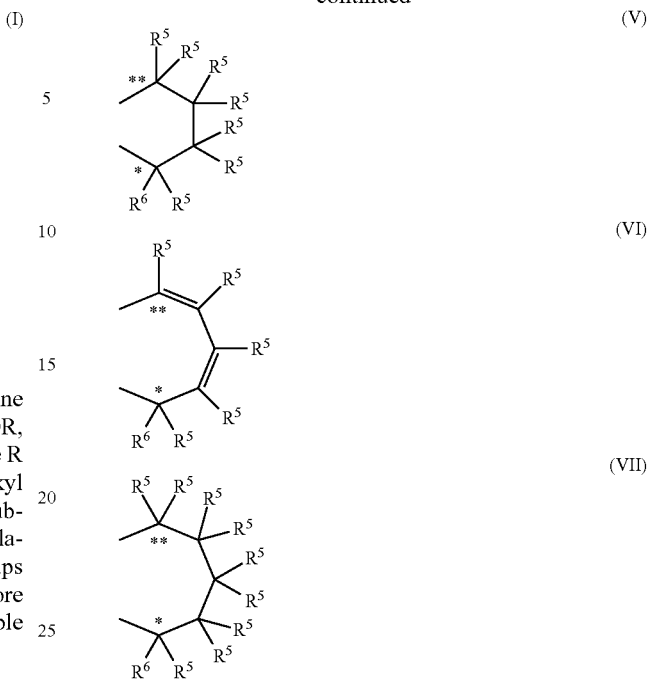

where the atoms denoted by the symbols * and ** are in each case joined to the atoms of the compound of the formula (I) which are denoted by the same symbol, and R$^5$ and R$^6$ are identical or different and are each, independently of one another, hydrogen or halogen or linear or branched C$_1$-C$_{20}$-alkyl or C$_3$-C$_{20}$-cycloalkyl which may bear one or more C$_1$-C$_{10}$-alkyl radicals as substituents, C$_6$-C$_{40}$-aryl, C$_7$-C$_{40}$-alkylaryl or C$_7$-C$_{40}$-arylalkyl and may contain one or more heteroatoms from groups 13-17 of the Periodic Table of the Elements or one or more unsaturated bonds or two radicals R$^5$ or R$^5$ and R$^6$ are joined to one another to form a saturated or unsaturated C$_3$-C$_{20}$ ring.

Among the metallocene compounds of the formula (I), particular preference is given to those in which M is zirconium.

Furthermore, preference is given to metallocene compounds of the formula (I) in which the substituent R in the radicals X is a C$_1$-C$_{10}$-alkyl such as methyl, ethyl, n-propyl, isopropyl, n-butyl, isobutyl, sec-butyl, tert-butyl, n-pentyl, n-hexyl, n-heptyl or n-octyl or C$_3$-C$_{20}$-cycloalkyl such as cyclopentyl or cyclohexyl. Preference is also given to metallocene compounds of the formula (I) in which the two radicals X are joined to one another so as to form a C$_4$-C$_{40}$-dienyl ligand, in particular a 1,3-dienyl ligand, or an —OR'O—, group in which the substituent R' is a divalent group selected from the group consisting of C$_1$-C$_{40}$-alkylidene, C$_6$-C$_{40}$-arylidene, C$_7$-C$_{40}$-alkylarylidene and C$_7$-C$_{40}$-arylalkylidene. X is more preferably a halogen atom or an —R or —OR group, or the two radicals X form an —OR'O— group. X is most preferably chlorine or methyl.

In preferred metallocene compounds of the formula (I), the divalent group L is a radical selected from the group consisting of the silylidenes —SiMe$_2$-, —SiPh$_2$-, —SiPhMe- and —SiMe(SiMe$_3$)— and the alkylidenes —CH$_2$—, —(CH$_2$)$_2$—, —(CH$_2$)$_3$— and —C(CH$_3$)$_2$—.

Preferred radicals R$^1$ and R$^2$ in the metallocene compounds of the formula (I) are linear or branched C$_1$-C$_{10}$-alkyl, in particular a linear C$_1$-C$_4$-alkyl group such as methyl, ethyl, n-propyl or n-butyl or a branched $C_3$- or $C_4$-alkyl group such as isopropyl or tert-butyl. In a particularly preferred embodiment, the radicals $R^1$ and $R^2$ are identical and are, in particular, both methyl, ethyl or isopropyl. In a further particularly preferred embodiment, $R^1$ is a linear or branched $C_1$-$C_{10}$-alkyl group which is unbranched in the α position, in particular a linear $C_1$-$C_4$-alkyl group such as methyl, ethyl, n-propyl or n-butyl, and $R^2$ is a $C_3$-$C_{10}$-alkyl group which is branched in the αposition, in particular a branched $C_3$- or $C_4$-alkyl group such as isopropyl or tert-butyl.

In preferred metallocene compounds of the formula (I), the radicals $R^5$ are each hydrogen or a linear or branched $C_1$-$C_{10}$-alkyl group, in particular a $C_1$-$C_4$-alkyl group, such as methyl, ethyl, n-propyl, i-propyl or n-butyl, or a $C_3$-$C_{10}$-cycloalkyl group, in particular $C_5$-$C_6$-cycloalkyl, such as cyclopentyl and cyclohexyl, $C_6$-$C_{18}$-aryl, such as phenyl or naphthyl, and $C_7$-$C_{24}$-alkylaryl, such as methylphenyl, ethylphenyl, n-propylphenyl, i-propylphenyl, t-butylphenyl, dimethylphenyl, diethylphenyl, diisopropylphenyl, ditertbutylphenyl, trimethylphenyl, methyl-t-butylphenyl, methylnaphthyl and dimethylnaphthyl, or where two adjacent radicals $R^5$ may be joined to form a 5-7-membered ring.

Furthermore, preference is given to metallocene compounds of the formula (I) in which $R^6$ together with an adjacent radical $R^5$ forms a cyclic system, in particular, an unsaturated 6-membered ring, or $R^6$ is an aryl group of the formula (XI),

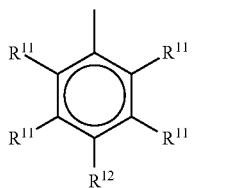

(XI)

where
$R^{11}$ are identical or different and are each, independently of one another, hydrogen or halogen or linear or branched $C_1$-$C_{20}$-alkyl, $C_3$-$C_{20}$-cycloalkyl which may bear one or more $C_1$-$C_{10}$-alkyl radicals as substituents, $C_6$-$C_{20}$-aryl, $C_7$-$C_{20}$-alkylaryl or $C_7$-$C_{20}$-arylalkyl and may contain one or more heteroatoms from groups 13-17 of the Periodic Table of the Elements or one or more unsaturated bonds, or two radicals $R^{11}$ may be joined to form an unsaturated $C_3$-$C_{20}$ ring, with preference being given to $R^{11}$ being a hydrogen atom, and $R^{12}$ is hydrogen or halogen or linear or branched $C_1$-$C_{20}$-alkyl, $C_3$-$C_{20}$-cycloalkyl which may bear one or more $C_1$-$C_{10}$-alkyl radicals as substituents, $C_6$-$C_{20}$-aryl, $C_7$-$C_{20}$-alkylaryl or $C_7$-$C_{20}$-arylalkyl and may contain one or more heteroatoms from groups 13-17 of the Periodic Table of the Elements or one or more unsaturated bonds, with preference being given to $R^{12}$ being a branched alkyl group of the formula —$C(R^{13})_3$, where $R^{13}$ are identical or different and are each, independently of one another, a linear or branched $C_1$-$C_6$-alkyl group or two or three radicals $R^{13}$ are joined to form one or more ring systems.

Typically, at least one of the groups T and T' is substituted by a radical $R^6$ of the formula (XI). Preferably, both groups T and T' are substituted by such a radical. More preferably, at least one of the groups T and T' is a group of the formula (IV) which is substituted by a radical $R^6$ of the formula (XI) and the other having either the formula (II) or (IV) and likewise being substituted by a radical $R^6$ of the formula (VII). In particular, such metallocene compounds have the formula (XII):

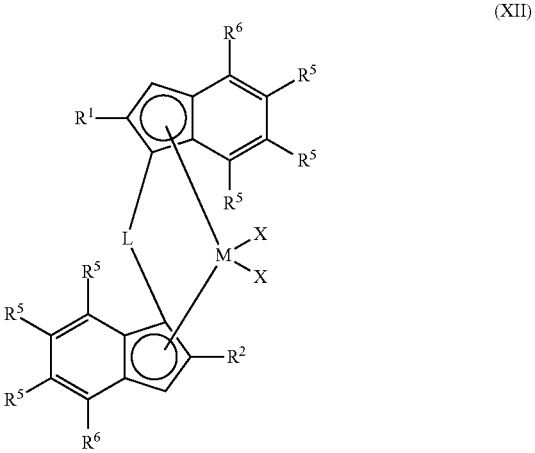

(XII)

Particularly useful metallocene compounds and processes for preparing them are described, for example, in WO 01/48034 and WO 03/045964.

The metallocene compounds of the formula (I) are preferably used in the rac or pseudo-rac form; the term pseudo-rac form refers to complexes in which the two groups T and T' are in the rac arrangement relative to one another when all other substituents of the complex are disregarded.

It is also possible to use mixtures of various metallocene compounds.

The comonomer of the LLDPE is preferably selected from 1-butene, 1-pentene, 1-hexene, 4-methyl-1-pentene, 1-heptene or 1-octene. More preferably, the comonomer is selected from 1-butene, 1-hexene or 1-octene. Most preferably, the comonomer is 1-butene or 1-hexene.

A particular class of single-site catalysts suitable for this invention is that chosen from a hybrid catalyst composition comprising at least two different single-site polymerization catalysts (A) and (B), where (A) is at least one metallocene polymerization catalyst, and where (B) is at least one polymerization catalyst based on a transition metal complex.

Hybrid Catalyst Component (A)

Single-site polymerization catalyst (A) is preferably based on hafnocene catalyst components and includes cyclopentadienyl complexes. The cyclopentadienyl complexes can include bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Particularly suitable hafnocenes (A) are hafnium complexes of the general formula (I)

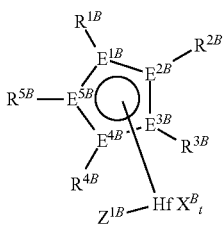
(I)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (VI) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and from 6 to 21 carbon atoms in the aryl part, $NR^{8B}{}_2$, $N(SiR^{8B}{}_3)_2$, $OR^{8B}$, $OSiR^{8B}{}_3$, $SiR^{8B}{}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^{1B}$ is $X^B$ or

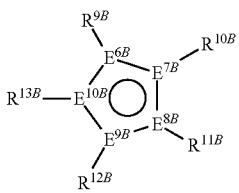

where the radicals $R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}{}_2$, $N(SiR^{14B}{}_3)_2$, $OR^{14B}$, $OSiR^{14B}{}_3$, $SiR^{14B}{}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an —$R^{15B}{}_v$-$A^{1B}$ group, where $R^{15B}$ is

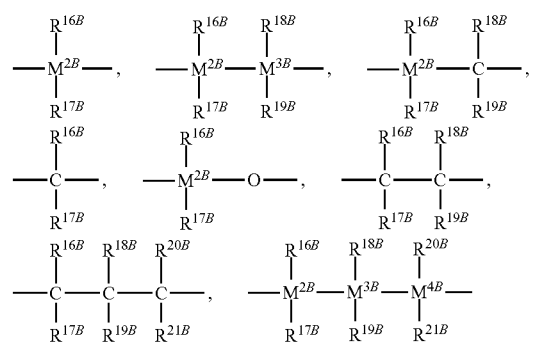

=$BR^{16B}$, =$BNR^{16B}R^{17B}$, =$AlR^{16B}$, —Ge—, —Sn—, —O—, —S—, =SO, =$SO_2$, =$NR^{16B}$, =CO, =$PR^{16B}$ or =$P(O)R^{16B}$, where $R^{16B}$-$R^{21B}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2B}$-$M^{4B}$ are each silicon, germanium or tin, or preferably silicon, $A^{1B}$ is —O—, —S—

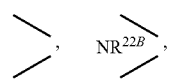, $NR^{22B}$, $PR^{22B}$, =O, =S, =$NR^{22B}$, —O—$R^{22B}$, —$NR^{22B}{}_2$, —$PR^{22B}{}_2$ or an unsubstituted, substituted or fused, heterocyclic ring system, where the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or Si($R^{23B}$)$_3$, $R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl, v is 1 or when $A^{1B}$ is an unsubstituted, substituted or fused, heterocyclic ring system may also be 0 or where the radicals $R^{4B}$ and $R^{12B}$ together form an —$R^{15B}$— group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, $3^{rd}$ revised edition, Verlag Chemie, Weinheim 1957.

The radicals $X^B$ in the general formula (I) are preferably identical, and preferably are selected from fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded. Typical hafnocenes (A) include methylenebis(cyclopentadienyl)hafnium dichloride, methylenebis(3-methylcyclopentadienyl)hafnium dichloride, methylenebis(3-n-butylcyclopentadienyl)hafnium dichloride, methylenebis(indenyl)hafnium dichloride, methylenebis(tetrahydroindenyl)hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl)hafnium dichloride, isopropylidenebis(3-phenylcyclopentadienyl)hafnium dichloride, isopropylidenebis(indenyl)hafnium dichloride, isopropylidenebis(tetrahydroindenyl)hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl)hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethyl indenyl)hafnium dichloride, dimethylsilanediylbis(2-methyl-4,5-benzindenyl)hafnium dichloride, dimethylsilanediylbis(2-ethyl-4,5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl)hafnium dichloride, diphenylsilanediylbis(2-methylindenyl)hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl)hafnium dichloride, dimethylsilanediylbis(2-ethyl-4-(1-naphthyl)indenyl)hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl)hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediylbis(2-methyl-4-[4'-tert-butylphenyl]indenyl)hafnium dichloride, dimethylsilanediylbis(2-ethyl-4-[4'-tert-butylphenyl]indenyl)hafnium dichloride, dimethylsilanediylbis(2-propyl-4-[4'-tert-butylphenyl]indenyl)hafnium dichloride, dimethylsilanediylbis(2-isopropyl-4-[4'-tert-butylphenyl]indenyl)hafnium dichloride, dimethylsilanediylbis(2-n-butyl-4-[4'-tert-butylphenyl]indenyl)hafnium dichloride, dimethylsilanediylbis(2-hexyl-4-[4'-tert-butylphenyl]indenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl]indenyl)(2-methyl-4-[1'-naphthyl]indenyl)hafnium dichloride and ethylene(2-isopropyl-4-[4'-tert-butylphenyl]indenyl)(2-methyl-4-[4'-tert-butylphenyl]indenyl)hafnium dichloride, and also the corresponding dimethylhafnium, monochloromono(alkylaryloxy)hafnium and di(alkylaryloxy)hafnium compounds. The complexes can be used in the rac form, the meso form or as mixtures of the two.

Among the hafnocenes of the general formula (I), those of the formula (II) are preferred.

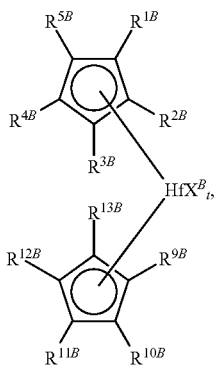

(II)

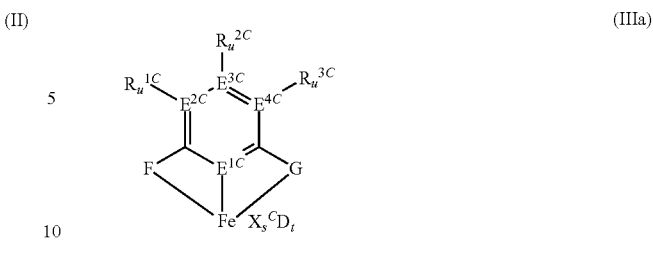

(IIIa)

wherein the variables F and G, independently of one another, are selected from the group consisting of:

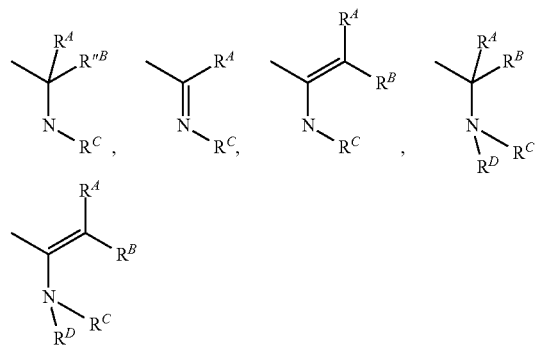

where $X^B$ is fluorine, chlorine, bromine, $C_1$-$C_4$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and $R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

Preferably, in the hafnocenes of the formula (II), the cyclopentadienyl radicals are identical. More preferably, the hafnocenes of formula (II) are selected from bis(cyclopentadienyl)hafnium dichloride, bis(indenyl)hafnium dichloride, bis(fluorenyl)hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis(trimethoxysilylcyclopentadienyl)hafnium dichloride, bis(ethylcyclopentadienyl)hafnium dichloride, bis(isobutylcyclopentadienyl)hafnium dichloride, bis(3-butenylcyclopentadienyl)hafnium dichloride, bis(methylcyclopentadienyl)hafnium dichloride, bis(1,3-di-tert-butylcyclopentadienyl)hafnium dichloride, bis(trifluoromethylcyclopentadienyl)hafnium dichloride, bis(tert-butylcyclopentadienyl)hafnium dichloride, bis(n-butylcyclopentadienyl)hafnium dichloride, bis(phenylcyclopentadienyl)hafnium dichloride, bis(N,N-dimethylaminomethylcyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl)hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis(tetramethylcyclopentadienyl)hafnium dichloride and also the corresponding dimethylhafnium compounds.

Hafnocene compounds also include those in which one or two of the chloride ligands have been replaced by bromide or iodide.

Hybrid Catalyst Component (B)

Single site catalyst component (B) is an iron catalyst complex of the general formulae (IIIa), with at least one ligand, where preferably, at least one of F and G is an enamine or imino radical selected from the said group, provided that when F is imino, G is imino, with G and F each bearing at least one aryl radical, and each bearing a halogen or a tert.alkyl substituent in the ortho-position, together giving rise to the tridentate ligand of formula IIIa. More preferably, at least one of F or G are an enamine radical. When both F and G are imino, G, F each bear at least one, preferably precisely one, aryl radical with each said aryl radical bearing at least one halogen or at least one tert.alkyl substituent, preferably precisely one halogen or one tert.alkyl, in the ortho-position, and $R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S, $R^A$, $R^B$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^A$, $R^B$ can also be substituted by halogens, and/or in each case two radicals $R^A$, $R^B$ can also be bonded with one another to form a five- or six-membered ring, $R^C$, $R^D$ independently of one another denote hydrogen, $C_1$-$C_{20}$-alkyl, $C_2$-$C_{20}$-alkenyl, $C_6$-$C_{20}$-aryl, arylalkyl having 1 to 10 C atoms in the alkyl radical and 6 to 20 C atoms in the aryl radical, or $SiR^{19C}_3$, wherein the organic radicals $R^C$, $R^D$ can also be substituted by halogens, and/or in each case two radicals $R^C$, $R^D$ can also be bonded with one another to form a five- or six-membered ring, $E^{1C}$ is nitrogen or phosphorus, in particular nitrogen,
$E^{2C}$-$E^{4C}$ are each, independently of one another, carbon, nitrogen or phosphorus, in particular carbon,
u is 0 when $E^{2C}$-$E^{4C}$ is nitrogen or phosphorus and is 1 when $E^{2C}$-$E^{4C}$ is carbon,
and wherein the radicals $R^{18C}$, $R^{19C}$, $X^C$ are defined in and for formula IIIa above identically as given for formula III below,
D is an uncharged donor and
s is 1, 2, 3 or 4,
t is 0 to 4.
Preferably, (B) is of formula (III):

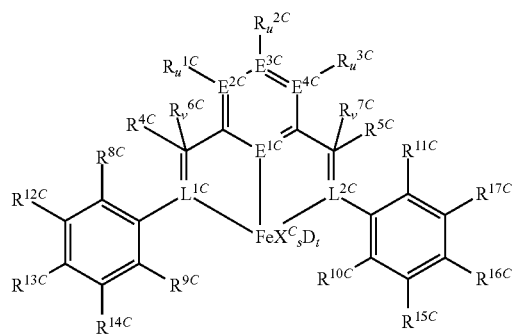

(III)

wherein the variables have the following meanings:
$E^{1C}$ is nitrogen or phosphorus, in particular nitrogen,
$E^{2C}$-$E^{4C}$ are each, independently of one another, carbon, nitrogen or phosphorus, in particular carbon,
$R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are joined to form a five-, six- or seven-membered heterocycle containing at least one atom from the group consisting of N, P, O and S,
$R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring, and/or two geminal or vicinal radicals $R^{4C}$-$R^{9C}$ are joined to form a five-, six- or seven-membered heterocycle containing at least one atom from the group consisting of N, P, O and S, and when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, and with the proviso that at least $R^{8C}$ and $R^{10C}$ are halogen or a tert. $C_1$-$C_{22}$-alkyl group,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S,
the indices v are each, independently of one another, 0 or 1,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens or nitrogen- and oxygen-containing groups and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring,
s is 1, 2, 3 or 4, in particular 2 or 3,
D is an uncharged donor and
t is from 0 to 4, in particular 0, 1 or 2.
The three atoms $E^{2C}$ to $E^{4C}$ in a molecule can be identical or different. If $E^{1C}$ is phosphorus, then $E^{2C}$ to $E^{4C}$ are preferably each carbon. If $E^{1C}$ is nitrogen, then $E^{2C}$ to $E^{4C}$ are each preferably nitrogen or carbon, in particular carbon.
The substituents $R^{1C}$-$R^{3C}$ and $R^{8C}$-$R^{17C}$ can be varied within a wide range. Possible carboorganic substituents $R^{1C}$-$R^{3C}$ and $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1C}$ to $R^{3C}$ and/or two vicinal radicals $R^{8C}\text{-}R^{17C}$ may also be joined to form a 5-, 6- or 7-membered ring and/or two of the vicinal radicals $R^{1C}\text{-}R^{3C}$ and/or two of the vicinal radicals $R^{8C}\text{-}R^{17C}$ may be joined to form a
five-, six- or seven-membered heterocycle containing at least one atom from the group consisting of N, P, O and S and/or the organic radicals $R^{1C}\text{-}R^{3C}$ and/or $R^{8C}\text{-}R^{17C}$ may also be substituted by halogens such as fluorine, chlorine or bromine. Furthermore, $R^{1C}\text{-}R^{3C}$ and $R^{8C}\text{-}R^{17C}$ can also be amino $NR^{18C}{}_2$ or $N(SiR^{19C}{}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}{}_3$ are the same carboorganic radicals as have been described above for $R^{1C}\text{-}R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals may also be bound to $E^{2C}\text{-}E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}\text{-}R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^{12C}\text{-}R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{9C}$ and $R^{11C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are preferably a halogen such as fluorine, chlorine or bromine, particularly chlorine and $R^{9C}$ and $R^{11C}$ are each a $C_1\text{-}C_{22}$-alkyl which may also be substituted by halogens, in particular a $C_1\text{-}C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine. In another preferred combination $R^{8C}$ and $R^{10C}$ are a tertiary $C_1\text{-}C_{22}$-alkyl radical, particularly tert. butyl and $R^{9C}$ and $R^{11C}$ are each hydrogen or a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The substituents $R^{4C}\text{-}R^{7C}$, too, can be varied within a wide range. Possible carboorganic substituents $R^{4C}\text{-}R^{7C}$ are, for example, the following: $C_1\text{-}C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1\text{-}C_{10}$-alkyl group and/or $C_6\text{-}C_{10}$-aryl group as substituent, e.g. cyclopropyl, cyclobutyl, cyclopentyl, cyclohexyl, cycloheptyl, cyclooctyl, cyclononyl or cyclododecyl, $C_2\text{-}C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6\text{-}C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two radicals $R^{4C}$ to $R^{7C}$ may also be joined to form a 5-, 6- or 7-membered ring and/or two geminal radicals $R^{4C}\text{-}R^{7C}$ may be joined to form a five-, six- or seven-membered heterocycle containing at least one atom from the group consisting of N, P, O and S and/or the organic radicals $R^{4C}\text{-}R^{7C}$ may also be substituted by halogens such as fluorine, chlorine or bromine. Furthermore, $R^{4C}\text{-}R^{7C}$ may be amino $NR^{18C}{}_2$ or $N(SiR^{19C}{}_3)_2$, for example dimethylamino, N-pyrrolidinyl or picolinyl. Possible radicals $R^{19C}$ in organosilicone substituents $SiR^{19C}{}_3$ are the same carboorganic radicals as have been described above for $R^{1C}\text{-}R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}{}_3$ radicals can also be bound via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferably, radicals $R^{4C}\text{-}R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{18C}{}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, in particular nitrogen, and when v is 0 can form a double bond with the carbon atom bearing $R^{4C}$ or $R^{5C}$. In particular, when v is 0, $L^{1C}$ and/or $L^{2C}$ together with the carbon atom bearing $R^{4C}$ or $R^{5C}$ form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ forms, in particular, an amido group —$CR^{4C}R^{6C}$—$N^-$— or —$CR^{5C}R^{7C}$—$N^-$—.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

The s substituents $R^{18C}$ are selected from $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes. The number t of the ligands D can be from 0 to 4 and is often dependent on the solvent in which the iron complex is prepared and the time for which the resulting complexes are dried and can therefore also be a nonintegral number such as 0.5 or 1.5. Preferably, t is 0, or 1 to 2.

Preferably, (B) has formula (IV):

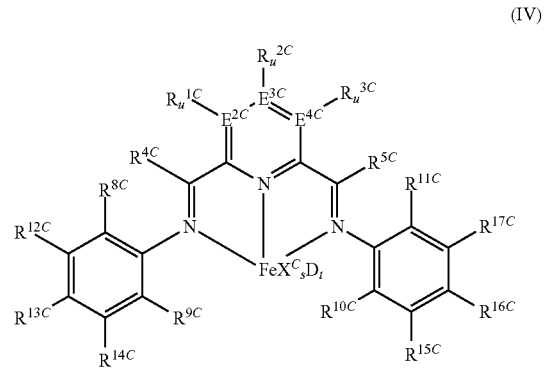

(IV)

where
$E^{2C}$-$E^{4C}$ are each, independently of one another, carbon, nitrogen or phosphorus, in particular carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S,
$R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{5C}$ may also be substituted by halogens,
u is 0 when $E^{1C}$-$E^{4C}$ is nitrogen or phosphorus and is 1 when $E^{1C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, and with the proviso that at least $R^{8C}$ and $R^{10C}$ are halogen or a tert. $C_1$-$C_{22}$-alkyl group,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O or S,
the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The substituents $R^{4C}$-$R^{5C}$ are selected from hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{4C}$-$R^{5C}$ may also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. Possible radicals $R^{19C}$ in organosilicon substituents $SiR^{19C}_3$ are the same carboorganic radicals as described above for $R^{1C}$-$R^{3C}$ where two radicals $R^{19C}$ may also be joined to form a 5- or 6-membered ring, e.g. trimethylsilyl, triethylsilyl, butyldimethylsilyl, tributylsilyl, tritertbutylsilyl, triallylsilyl, triphenylsilyl or dimethylphenylsilyl. These $SiR^{19C}_3$ radicals can also be bound via nitrogen to the carbon bearing them.

Preferably, $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

$R^{8C}$-$R^{17C}$ can be a $C_1$-$C_{22}$-alkyl, which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritertbutylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert-butylsilyloxy.

Preferably, $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferably, radicals $R^{9C}$ and $R^{11C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^8$ and $R^{10C}$ are preferably a halogen such as fluorine, chlorine or bromine, particularly chlorine and $R^{9C}$ and $R^{11C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine. In another preferred combination $R^{8C}$ and $R^{10C}$ are a tertiary $C_1$-$C_{22}$-alkyl radical, particularly tert. butyl and $R^{9C}$ and $R^{11C}$ are each hydrogen or a halogen such as fluorine, chlorine or bromine.

More preferably, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^8$ and $R^{10C}$ are identical. This is also preferred in the preferred embodiments described above.

The preparation of the compound (B) is described, for example, in J. Am. Chem. Soc. 120, p. 4049 ff. (1998), J. Chem. Soc., Chem. Commun. 1998, 849, and WO 98/27124. Preferred complexes B) are 2,6-Bis[1-(2-tert.butylphenylimino)ethyl]pyridine iron(II) dichloride, 2,6-Bis[1-(2-tert.butyl-6-chlorophenylimino)ethyl]pyridine iron(II) dichloride, 2,6-Bis[1-(2-chloro-6-methylphenylimino)ethyl]pyridine iron(II) dichloride, 2,6-Bis[1-(2,4-dichlorophenylimino)ethyl]pyridine iron(II) dichloride, 2,6-Bis[1-(2,6-dichlorophenylimino)ethyl]pyridine iron(II) dichloride, 2,6-Bis[1-(2,4-dichlorophenylimino)methyl]pyridine iron(II) dichloride, 2,6-Bis[1-(2,4-dichloro-6-methylphenylimino)ethyl]pyridine iron(II) dichloride 2,6-Bis[1-(2,4-difluorophenylimino)ethyl]pyridine iron(II) dichloride, 2,6-Bis[1-(2,4-dibromophenylimino)ethyl]pyridine iron(II) dichloride or the respective trichlorides, dibromides or tribromides.

The molar ratio of transition metal complex (A) to polymerization catalyst (B) is usually in the range from 1:100 to 100:1, preferably from 1:10 to 10:1 and particularly preferably from 1:1 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A) and (B) are likewise preferred in combinations of the two complexes.

The catalyst system of the invention preferably comprises one or more activators (C), which can be brought into contact with the metallocene catalyst component or with the hybrid catalyst components (A) and (B). In case of a hybrid catalyst, the activation of the transition metal complex (A) and of the iron complex (B) of the catalyst composition can be carried out using the same activator or activator mixture or different activators. Preferably, the same activator (C) for both the catalysts (A) and (B).

The activator or activators (C) can in each case be used in any amounts based on the complexes (A) and (B) of the catalyst composition of the invention. They are preferably used in an excess or in stoichiometric amounts, in each case based on the complex (A) or (B) which they activate. The amount of activating compound(s) to be used depends on the type of the activator (C). In general, the molar ratio of transition metal complex (A) to activating compound (C) can be from 1:0.1 to 1:10000, preferably from 1:1 to 1:2000. The molar ratio of iron complex (B) to activating compound (C) is also usually in the range from 1:0.1 to 1:10000, preferably from 1:1 to 1:2000.

Suitable compounds (C) include aluminoxanes and strong uncharged Lewis acids, as described, for example, in WO 00/31090; hydroxyaluminoxanes such as those described in WO 00/24787, ionic compounds having a Lewis-acid cation as described, for example, in WO 91/09882 or ionic compounds containing a Brönsted acid as cation, such as protonated amine or aniline derivatives.

Preferably, component (C) is selected from boranes and boroxins such as trialkylborane, triarylborane or trimethylboroxin. More preferably, component (C) is selected from boranes which bear at least two perfluorinated aryl radicals. Most preferably, component (C) is selected from triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane. Preference is given to using tris(pentafluorophenyl)borane.

As joint activator (C) for the catalyst component (A) and (B), preference is given to using an aluminoxane. Preference is also given to the combination of salt-like compounds of the cation of the general formula (XIII), in particular N,N-dimethylanilinium tetrakis(pentafluorophenyl)borate, N,N-dimethylcyclohexylammonium tetrakis(pentafluorophenyl)borate, N,N-dimethylbenzylammonium tetrakis(pentafluorophenyl)borate or trityl tetrakispentafluorophenylborate, as activator (C) for hafnocenes (A), in particular in combination with an aluminoxane as activator (C) for the iron complex (B).

To enable the single-site catalysts to be used in polymerization processes in the gas phase or in suspension, it is often advantageous to use the complexes in the form of a solid, i.e. for them to be applied to a solid support (D). Furthermore, the supported complexes have a high productivity. The metallocene complexes, the transition metal complexes (A) and/or the iron complex (B) can therefore also optionally be immobilized on an organic or inorganic support (D) and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Among the hybrid catalyst systems, particular preference is given to a catalyst system comprising at least one transition metal complex (A), at least one iron complex (B), at least one activating compound (C) and at least one support component (D). It is possible for both the transition metal component (A) and the iron complex (B) to be supported, or only one of the two components can be supported. In a preferred embodiment, both the components (A) and (B) are supported. The two components (A) and (B) can in this case be applied to different supports or together on a joint support. The components (A) and (B) are preferably applied to a joint support in order to ensure a relatively close spatial proximity of the various catalyst centers and thus to ensure good mixing of the different polymers formed.

As support component (D), preference is given to using finely divided supports which can be any organic or inorganic solid. In particular, the support component (D) can be a porous support such as talc, a sheet silicate such as montmorillonite, mica or an inorganic oxide or a finely divided polymer powder (e.g. polyolefin or a polymer having polar functional groups). Preferably, support (D) is selected from hydrotalcites and calcined hydrotalcites.

As solid support materials (D) for catalysts for olefin polymerization, preference is given to using silica gels since particles whose size and structure make them suitable as supports for olefin polymerization can be produced from this material. Spray-dried silica gels, which are spherical agglomerates of relatively small granular particles, i.e. primary particles, have been found to be particularly useful. The silica gels can be dried and/or calcined before use.

The hybrid catalyst system may further comprise, as additional component (E), a metal compound of the general formula (XX),

(XX)

where $M^G$ is Li, Na, K, Be, Mg, Ca, Sr, Ba, boron, aluminum, gallium, indium, thallium, zinc, in particular Li, Na, K, Mg, boron, aluminum or Zn, $R^{1G}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part, $R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl part and from 6 to 20 carbon atoms in the aryl part, or alkoxy together with $C_1$-$C_{10}$-alkyl or $C_6$-$C_{15}$-aryl, $r^G$ is an integer from 1 to 3 and $s^G$ and $t^G$ are integers from 0 to 2, with the sum $r^G+s^G+t^G$ corresponding to the valence of $M^G$, where the component (E) is usually not identical to the component (C). It is also possible to use mixtures of various metal compounds of the formula (XX).

Among the metal compounds of the general formula (XX), preference is given to those in which
$M^G$ is lithium, magnesium, boron or aluminum and
$R^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound (E) is used, it is preferably present in the catalyst system in such an amount that the molar ratio of $M^G$ from formula (XX) to the sum of the transition metals from the transition metal complex (A) and the iron complex (B) is from 3000:1 to 0.1:1, preferably from 800:1 to 0.2:1 and particularly preferably from 100:1 to 1:1.

In another preferred embodiment, a catalyst solid is prepared from the components (A), (B), (C) and (D) as described above and this is brought into contact with the component (E) during, at the commencement of or shortly before the polymerization.

Preference is given to firstly bringing (E) into contact with the α-olefin to be polymerized and subsequently adding the catalyst solid comprising the components (A), (B), (C) and (D) as described above.

In a further, preferred embodiment, the support (D) is firstly brought into contact with the component (E), and the components (A) and (B) and any further activator (C) are then dealt with as described above.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200.

LLDPE Composition

The LLDPEs used in the films of the invention have little or no long chain branching. This is evidenced by a value of the slice long chain branching index (SLCBI), determined according to the procedure outlined in U.S. Pat. No. 6,870,010, of at least 0.90 for any portion of the composition having a molecular weight of 100,000 or more. These LLDPE's exhibit improved haze reductions when blended with the LDPE used in films of the invention.

U.S. Pat. No. 6,870,010 defines SLCBI according to the equation:

$$SLCBI = \frac{[\eta]_i}{[\eta]_{Linear,i}}$$

In the above equation $[\eta]_i$ is the measured intrinsic viscosity of a given retention volume slice "i" and $[\eta]_{Linear,i}$ is the intrinsic viscosity of a reference, linear polymer without long chain branching, at the same retention volume slice "i". For polymers of relatively broad molecular weight distribution (Mz/Mw greater than about 2.5) the above equation works satisfactorily with the following reference choice:

$$[\eta]_{Linear,i} = kM_i^\alpha$$

where $M_i$ is the measured molecular weight at retention volume slice "i" and k,α are the Mark-Houwink coefficients (k=3.75E-4 and α=0.728, as measured in our laboratory). For polymers of very narrow molecular weight distribution (Mz/Mw less than about 2.5), such as metallocene-catalyzed polyethylenes, the above reference choice produces unrealistic SLCBI values, at least partly due to the axial dispersion effect in gel permeation chromatography (GPC) of narrow molecular weight distribution polymers. Therefore, for metallocene-catalyzed polyethylenes, the reference polymer chosen was Exceed 1018CA, commercially available from ExxonMobil and used in U.S. Pat. No. 6,870,010 as a reference polymer with SLCBI=1.

When the LLDPE is produced with a metallocene single-site catalyst, the composition distribution breadth index (CDBI) is from 65 to 85. When the LLDPE is produced with a metallocene hybrid catalyst, the CDBI is from 30 to 60. CDBI is described in WO 93/03093, and is defined as the percent by weight or mass fraction of the copolymer molecules having a comonomer content of ±50% of the mean molar total comonomer content, i.e., the percentage of comonomer molecules whose comonomer content is within 50% of the average (median) comonomer content. This is determined by temperature rising elution fraction (TREF) analysis (Wild et al. J. Poly. Sci., Poly. Phys. Ed. Vol. 20, (1982), 441).

When the LLDPE is produced with a metallocene single-site catalyst, the rheological polydispersity (ER) is less than 0.4, preferably less than 0.25. When the LLDPE is produced with a metallocene hybrid catalyst, the rheological polydispersity (ER) is less than 0.5. Rheological polydispersity (ER) is obtained from rheological measurements performed on molten resins and is influenced by the type and amount of long chain branching and by the breadth of the molecular weight distribution. "ER" is one of the art-recognized measures of rheological polydispersity. ER is determined from plots of storage modulus (G') versus loss modulus (G") and is a measure of high-molecular-weight-end polydispersity. ER is conveniently determined as discussed in R. Shroff and H. Mavridis, "New Measures of Polydispersity from Rheological Data on Polymer Melts," J. Applied Polymer Science 57 (1995) 1605. See also U.S. Pat. Nos. 7,238,754, 6,171,993 and 5,534,472, the teachings of which are incorporated herein by reference.

When the LLDPE is produced with a metallocene single-site catalyst, the xylene solubles are less than 1.5 wt %, preferably less than 1.0 wt %. The xylene solubles are measured by the following procedure. Two grams of LLDPE sample is placed in 200 ml of o-xylene. The solution is refluxed and stirred until the sample is fully dissolved. The solution is then cooled to 25° C. in a water-bath for 30 minutes for the polymer to precipitate. The solution is filtered and dried. The xylene solubles are calculated by dividing the weight of the dried sample by the total weight of the LLDPE sample. When the LLDPE is produced with a metallocene hybrid catalyst the xylene solubles are less than about 12 wt %

The blend composition contains from 0.15 to 0.8 wt % LDPE and 99.2 to 99.85 wt % LLDPE, preferably 0.25 to 0.6 wt % LDPE and 99.4 to 99.75 wt % LLDPE based on the total amount of LDPE and LLDPE. The compositions used in the films preferably have an SLCBI of at least 0.90.

The film blends are preferably prepared by melt-blending the LDPE with the LLDPE before film extrusion to form a blend extrudate and then feeding the extrudate to the film extruder. For example, the LDPE can be melt-extruded into the LLDPE along with other additives during the finishing and pelletization step in the LLDPE production or post-LLDPE production, such as in a Banbury mixer, twin screw extruder or similar equipment known to those skilled in the art. Blending the components in such a way provides improved performance over dry-blending the components together during film extrusion, e.g., in the feed to the film extruder processing the blend.

The films of the invention exhibit an enhanced balance of properties. Haze is determined in accordance with ASTM D1003. Films prepared from the blend compositions of the invention demonstrate a haze ($HZ_{blend}$) lower than the haze of a film produced from the LLDPE used in the blend composition ($HZ_{lldpe}$), while minimizing undesirable reductions in dart impact ($DI_{blend}$) and Elmendorf Tear ($MDT_{blend}$) relative to that of the dart impact ($DI_{lldpe}$) and Elmendorf Tear ($MDT_{lldpe}$) of the LLDPE used in the blend. Dart impact is measured in accordance with ASTM D1709 (F50), of the blend composition film ($DI_{blend}$), relative to that of the LLDPE in the blend ($DI_{lldpe}$). The film properties of the blend compositions and the LLDPE used in the blend compositions satisfy the following relationship:

$HZ_{blend}=a*HZ_{lldpe}$, where $a$ is 0.20 to 0.70, preferably 0.30 to 0.55, where $HZ_{blend}$ and $HZ_{lldpe}$ are measured on a film of the same thickness, and $DI_{blend}=b*DI_{lldpe}$, where $b$ is 0.9 to 1.3, preferably, 0.95 to 1.1, where $DIHZ_{blend}$ and $HZ_{lldpe}$ are measured on a film of the same thickness.

When the polymer blend contains less than 1000 ppm of additives selected from antiblocks, slip agents and mixtures thereof, and the LLDPE is produced with a metallocene single site catalyst, a is preferably 0.20 to 0.30.

$HZ_{lldpe}$ is preferably below 20%, more preferably below 18%, as measured on a 1.0 mil film.

Elmendorf Tear is determined in accordance with ASTM D1922. When the LLDPE is produced with a metallocene single site catalyst, the MD-Tear properties of the blend compositions satisfy the following relationship:

$MDT_{blend}=c*MDT_{lldpe}$, where $c$ is 0.8 to 1.1, preferably, 0.85 to 1.0, where $MDT_{blend}$ and $MDT_{lldpe}$ are measured on a film of the same thickness.

Gloss-45 is determined in accordance with ASTM D2457. Preferably, when the LLDPE is produced with a metallocene single site catalyst, the films prepared from the blend compositions have a gloss-45, as measured in a 1-mil film, of greater than 60%. When the LLDPE is produced with a metallocene hybrid catalyst, the gloss is preferably greater than 50. Clarity is determined in accordance with ASTM D1746. Preferably, when the LLDPE is produced with a metallocene single site catalyst, the films prepared from the blend compositions have a clarity as measured in a 1-mil film of greater than 65%, more preferably greater than 80%. When the LLDPE is produced with a metallocene hybrid catalyst, the clarity is greater than 60%. The films prepared from the blend compositions preferably have a DI, as measured in a 1-mil film, of greater than 400 g/mil, more preferably greater than 500 g/mil. When the LLDPE is produced with a metallocene single site catalyst, the films prepared from compositions of the invention preferably have an MD-Tear as measured in a 1-mil film of greater than 200 g/mil. When the LLDPE is produced with a metallocene hybrid catalyst, the MD-Tear is preferably greater than 150 g/mil.

Films produced from the compositions exhibit an improved blend of optical and physical properties when compared with conventional blends of LLDPE and LDPE, i.e., the blends demonstrate a reduced negative impact on physical properties for a given improvement in haze. Alternately, for a given amount of LDPE, films produced from the compositions demonstrate an improved reduction in haze. At the very low levels of LDPE in the compositions (less than 1 wt %), standard conventional feeders typical of additive systems, can be used for the addition of the LDPE to the LLDPE, thereby saving capital investment. Very low percentages of LDPE in the film blend also provide cost advantages over systems containing higher levels of LDPE, since LDPE is typically more expensive than LLDPE.

The blend composition can contain additives selected from anti-block agents, slip agents or mixtures thereof. Anti-block agents include talc, diatomaceous earth, synthetic amorphous silicon dioxide (precipitated), nepheline syenite, clay, pumice, mica, zeolites, microcrystalline silica, aluminum oxide, zinc oxide, calcium sulfate, barium sulfate, magnesium carbonate, silicone polymer, cross-linked polymethacrylate resin, magnesium 12-hydroxyoctadecanoate, behenamide, and mixtures thereof. Slip agents include erucamide, oleamide, behenamide, oleyl palmitamide, stearyl erucamide, ethylene bis-stereamide, stereamide, calcium stearate, low viscosity polydimethylsiloxane, UHMW siloxane, N,N' Ethylene bisstearamide, silicone polymer, PTFE, and mixtures thereof. Preferably, the blend composition contains less than 1000 ppm, more preferably, less than 500 ppm of additives selected from anti-block agents, slip agents or mixtures thereof.

The blend composition can include other additives, preferably selected from stabilizers, UV absorbers, metal deactivators, thiosynergists, peroxide scavengers, basic co-stabilizers, acid scavengers, nucleating agents, clarifiers, conventional fillers, dispersing agents, plasticizers, lubricants, emulsifiers, pigments, optical brighteners, flame-proofing agents, antistatic agents, blowing agents, and mixtures thereof.

In this specification, the term "film" shall mean a single layer or multiple layers of the polymer blend, each layer having a thickness of from 0.1 to 10 mils. Preferably, each layer has a thickness of 0.1 to 2 mils. The films can be of any type prepared by processes well known to those skilled in the art, such as cast, blown-air, blown-water, oriented, and biaxially oriented. The films may also be used in extrusion coating and extrusion lamination processes. When the films are coextruded, they can be produced using conventional methods and extrusion equipment well known to those skilled in the art, where layers of polymer melts are combined by introducing multiple polymer melt streams into a combining block/manifold or die which then directs the melt streams to flow together (while still in the block/manifold or die), then exiting the die together as a single flow stream. Alternately, multiple polymer melt streams can be introduced into a die and then combined just after exiting the die.

Preferably, the films are blown or cast films. More preferably, the films are blown films.

The following examples illustrate the invention; however, those skilled in the art will recognize numerous variations within the spirit of the invention and scope of the claims.

Blends of the examples were prepared using the following LDPE, LLDPE and additive components:

LDPE-1 Tubular LDPE having a density of 0.920 g/cm$^3$ and an MI of 0.18 dg/min., commercially available from Equistar Chemicals, LP having the tradename Petrothene® NA942000.

LDPE-2 Tubular LDPE having a density of 0.920 g/cm$^3$ and an MI of 1.0 dg/min., commercially available from Equistar Chemicals, LP having the tradename Petrothene® NA960000.

LDPE-3 Autoclave LDPE having a density of 0.918 g/cm$^3$ and an MI of 7.0 dg/min., commercially available from Equistar Chemicals, LP having the tradename Petrothene® NA204000.

LLDPE-1 C$_6$-LLDPE having a density of 0.918 g/cm$^3$ and an MI of 1.0 dg/min, a CDBI of 70, xylene solubles of 0.9 wt %, and a rheological polydispersity (ER) of 0.14, produced using a metallocene catalyst in a Unipol gas-phase process, commercially available from Equistar Chemicals, LP having the tradename Starflex® GM1810BA. The SLCBI is shown in FIG. 1.

LLDPE-2 C$_6$-LLDPE having a density of 0.918 g/cm$^3$, an MI of 1.0 dg/min, CDBI of 50, xylene solubles of 13.4 wt % and a rheological polydispersity (ER) of 0.72, produced using the Ziegler Natta catalyst in a Unipol gas-phase process, commercially available from Equistar Chemicals, LP having the tradename Petrothene® GA601030. The SLCBI is shown in FIG. 1

Adt-1 Talc antiblock additive (Optibloc™ 10), commercially available from Specialty Minerals.

Adt-2 Slip additive (erucamide) commercially available from Croda.

All parts and percentages used in this specification are by weight unless otherwise specified.

In the following examples, unless otherwise specified, all blown films were produced in an LLDPE blown film line equipped with a 2" diameter smooth-bore extruder, 24:1 L/D barrier screw with a Maddock mixing section. The smooth bore extruder was equipped with a 4" diameter die and 0.060" die gap. Operating conditions included an output rate of 63 lb/hr, a blow-up-ratio of 2.5:1, a 12" frostline height and melt temperature of approximately 225° C.

Control Example 1

LLDPE-1 was processed in a blown film line to form a blown film of 0.75 mil thickness.

Example 2

A blend containing 99.75 wt % LLDPE-1 and 0.25 wt % LDPE-1 was prepared by melt-extruding the components in a ZSK-30 twin-screw extruder. A blown film of 0.75 mil thickness was then prepared from the extrudate.

Example 3

A blend and film were prepared as in Example 2 except that 99.5 wt % LLDPE-1 and 0.5 wt % LDPE-1 was used.

Example 4

A blend and film were prepared as in Example 2 except that 99.25 wt % LLDPE-1 and 0.75 wt % LDPE-1 was used.

TABLE 1

|  | Control. Ex. 1 | Ex. 2 | Ex. 3 | Ex. 4 |
| --- | --- | --- | --- | --- |
| Haze, % | 12 | 3.3 | 2.4 | 2.3 |
| DI, g/mil | 510 | 570 | 570 | 530 |
| MD-Tear, g/mil | 139.1 | 151 | 131.2 | 131.1 |
| Haze$_{blend}$/Haze$_{lldpe}$ |  | 0.28 | 0.20 | 0.19 |
| DI$_{blend}$/DI$_{lldpe}$ |  | 1.12 | 1.12 | 1.04 |
| MDT$_{blend}$/MDT$_{lldpe}$ |  | 1.09 | 0.94 | 0.94 |

The results demonstrate improved haze for the claimed films produced from the blend compositions with minimal deterioration in physical properties.

Control Example 5

A blend containing 99.5 wt % LLDPE-1 and 0.4 wt % Adt-1 and 0.1 wt % Adt-2 was prepared by processing the blend components in a twin-screw extruder to form an extrudate. A 0.75 mil blown film was then prepared from the extrudate.

Example 6

A blend containing 99.0 wt % LLDPE-1, 0.5 wt % LDPE-1, 0.4 wt % Adt-1 and 0.1 wt % Adt-2 and film were prepared as in Comparative Example 5. A 0.75 mil blown film was then prepared from the extrudate.

TABLE 2

|  | Control Ex. 5 | Ex. 6 |
| --- | --- | --- |
| Haze, % | 15 | 7.5 |
| Gloss-45, % | 47 | 70 |
| Clarity, % | 40 | 52 |
| DI, g/mil | 281 | 274 |
| MD-Tear, g/mil | 146 | 144 |
| Haze$_{blend}$/Haze$_{lldpe}$ |  | 0.5 |
| DI$_{blend}$/DI$_{lldpe}$ |  | 0.98 |
| MDT$_{blend}$/MDT$_{lldpe}$ |  | 0.99 |

The results demonstrate improved haze for the claimed films produced from the blend compositions with minimal deterioration in physical properties.

Control Example 7

LLDPE-1 was processed in a blown film line to form a blown film of 1.0 mil thickness.

Example 8

A blend containing 99.5 wt % LLDPE-1 and 0.5 wt % LDPE-1 was prepared by melt-extruding the components in a ZSK-30 twin-screw extruder to form an extrudate. A blown film of 1 mil thickness was then prepared from the extrudate.

Control Example 9

A blend containing 99.5 wt % LLDPE-1 and 0.4 wt % Adt-1 and 0.1 wt % Adt-2 was prepared by processing the blend components in a twin-screw extruder to form an extrudate. A 1.0 mil blown film was then prepared from the extrudate.

Example 10

A blend containing 99.0 wt % LLDPE-1, 0.5 wt % LDPE-1, 0.4 wt % Adt-1 and 0.1 wt % Adt-2 and film were prepared as in Comparative Example 9. A 1.0 mil blown film was then prepared from the extrudate.

TABLE 3

|  | Control Ex. 7 | Ex. 8 | Control Ex. 9 | Ex. 10 |
|---|---|---|---|---|
| Haze, % | 13 | 4.3 | 16 | 8.1 |
| Gloss-45, % | 49 | 80 | 46 | 69 |
| Clarity, % | 69 | 84 | 38 | 52 |
| DI, g/mil | 830 | 810 | 510 | 660 |
| MD-Tear, g/mil | 247 | 228 | 228 | 215 |
| $HZ_{blend}/HZ_{lldpe}$ |  | 0.33 |  | 0.51 |
| $DI_{blend}/DI_{lldpe}$ |  | 0.98 |  | 1.29 |
| $MDT_{blend}/MDT_{lldpe}$ |  | 0.92 |  | 0.94 |

The results demonstrate improved haze for the claimed films produced from the blend compositions with minimal deterioration in physical properties.

Comparative Examples 11-16 were conducted using a die gap of 0.100 inch.

Comparative Example 11

LLDPE-2 was processed in a blown film line to form a blown film of 1.0 mil thickness.

Comparative Example 12

A blend containing 99.5 wt % LLDPE-2 and 0.5 wt % LDPE-1 was prepared by melt-extruding the components in a ZSK-30 twin-screw extruder to form an extrudate. A blown film of 1.0 mil thickness was then prepared from the extrudate.

Comparative Example 13

A blend containing 99.5 wt % LLDPE-2 and 0.5 wt % LDPE-2 was prepared by processing the blend components in a ZSK-30 twin-screw extruder to form an extrudate. A blown film of 1.0 mil thickness was then prepared from the extrudate.

Comparative Example 14

A blend containing 99.5 wt % LLDPE-2 and 0.5 wt % LDPE-3 was prepared by melt-extruding the components in a ZSK-30 twin-screw extruder to form an extrudate. A blown film of 1.0 mil thickness was then prepared from the extrudate.

Comparative Example 15

A 1.0 mil film was prepared from a blend of 99.0 wt % LLDPE-2 and 1.0 wt % LDPE-2. The LDPE and LLDPE were dry-blended by feeding both together into the feed hopper of the blown film extruder.

Comparative Example 16

A 1.0 mil film was prepared from a blend of 90.0 wt % LLDPE-2 and 10.0 wt % LDPE-2. The LDPE and LLDPE were dry-blended by feeding both together into the feed hopper of the blown film extruder.

TABLE 4

|  | Comp. Ex. 11 | Comp. Ex. 12 | Comp. Ex. 13 | Comp. Ex. 14 | Comp. Ex. 15 | Comp. Ex. 16 |
|---|---|---|---|---|---|---|
| Haze, % | 10 | 9.4 | 10 | 8.9 | 9.1 | 5.3 |
| Gloss-45, % | 52 | 57 | 54 | 58 | 58 | 72 |
| Clarity, % | 74 | 76 | 75 | 77 | 77 | 77 |
| DI, g/mil | 169 | 161 | 166 | 194 | 149 | 137 |
| MD-Tear, g/mil | 360 | 327 | 368 | 362 | 327 | 162 |
| $Haze_{blend}/Haze_{lldpe}$ |  | 0.94 | 1.0 | 0.89 | 0.91 | 0.53 |
| $DI_{blend}/DI_{lldpe}$ |  | 0.95 | 0.98 | 1.15 | 0.88 | 0.81 |
| $MDT_{blend}/MDT_{lldpe}$ |  | 0.91 | 1.02 | 1.01 | 0.91 | 0.45 |

The results demonstrate an inferior relationship between haze improvement and deterioration of physical properties with the addition of various LDPE compared to the claimed films produced from the recited blend compositions.

The present subject matter being thus described, it will be apparent that the same may be modified or varied in many ways. Such modifications and variations are not to be regarded as a departure from the spirit and scope of the present subject matter, and all such modifications and variations are intended to be included within the scope of the following claims.

I claim:

1. A film comprising:
    a polymer blend of:
    (a) 0.15 to 0.8 wt % of an LDPE having an MI of 0.1 to 0.6 dg/min and a density of 0.910 to 0.940 g/cm$^3$; and
    (b) 99.2 to 99.85 wt % of an LLDPE produced with a single-site catalyst comprising a metallocene, and having a haze ($HZ_{lldpe}$), dart impact ($DI_{lldpe}$), MD-Tear ($MDT_{lldpe}$), and a slice long chain branching index of at least 0.90 for any portion of the composition having a molecular weight of 100,000 or above,
    wherein the LLDPE has a composition distribution breadth index from 65 to 85, a rheological polydispersity of less than 0.5, a density of 0.910 to 0.940 g/cm$^3$, and a melt index from 0.2 to 10 dg/min,
    wherein the film has a haze ($HZ_{blend}$), a dart impact ($DI_{blend}$), and an MD-Tear ($MDT_{blend}$), and $HZ_{blend}=a*HZ_{lldpe}$, where $a$ is 0.20 to 0.70;

$DI_{blend}=b*DI_{lldpe}$, where $b$ is 0.9 to 1.3; and $MDT_{blend}=c*MDT_{lldpe}$, where $c$ is 0.8 to 1.1.

2. The film of claim 1 wherein the film is formed from an extrudate of the blend.
3. The film of claim 1 wherein the LDPE is present in an amount from 0.25 to 0.6 wt %.
4. The film of claim 1 wherein the polymer blend contains less than 1000 ppm of additives selected from antiblocks, slip agents and mixtures thereof, and a is 0.20 to 0.30.
5. The film of claim 1 wherein the LDPE MI is 0.1 to 0.4 dg/min.
6. The film of claim 1 wherein the LLDPE is a copolymer of ethylene and a comonomer selected from 1-butene, 1-hexene or 1-octene.
7. The film of claim 6 wherein the comonomer is 1-butene or 1-hexene.
8. The film of claim 6 wherein the comonomer is present in an amount from 2 to 12 wt %.
9. The film of claim 1 produced by a blown film process.
10. The film of claim 1 wherein the catalyst comprises a hybrid catalyst.

11. A process comprising forming a film comprising a polymer blend comprising:
  (a) 0.15 to 0.8 wt % of an LDPE having an MI of 0.1 to 0.6 dg/min and a density of 0.910 to 0.940 g/cm$^3$; and
  (b) 99.2 to 99.85 wt % of an LLDPE produced with a single-site catalyst comprising a metallocene, and having a haze ($HZ_{lldpe}$), dart impact ($DI_{lldpe}$), an MD-Tear ($MDT_{lldpe}$), and a slice long chain branching index of at least 0.90 for any portion of the composition having a molecular weight of 100,000 or above,
    wherein the LLDPE has a composition distribution breadth index from 65 to 85, a rheological polydispersity of less than 0.5, a density of 0.910 to 0.940 g/cm$^3$, and a melt index from 0.2 to 10 dg/min,
    wherein the film has a haze ($HZ_{blend}$), a dart impact ($DI_{blend}$), and an MD-Tear ($MDT_{blend}$), and $$HZ_{blend} = a * HZ_{lldpe}, \text{ where } a \text{ is } 0.20 \text{ to } 0.70;$$

$$DI_{blend} = b * DI_{lldpe}, \text{ where } b \text{ is } 0.9 \text{ to } 1.3; \text{ and}$$

$$MDT_{blend} = c * MDT_{lldpe}, \text{ where } c \text{ is } 0.8 \text{ to } 1.1.$$

12. The process of claim 11 wherein the film is formed from an extrudate of the blend.

13. The process of claim 12 wherein the LDPE is present in an amount from 0.3 to 0.6 wt %.

14. The process of claim 11 wherein the LDPE MI is 0.1 to 0.4 dg/min.

15. The process of claim 11 wherein the catalyst comprises a hybrid catalyst.

\* \* \* \* \*